US000001927H

United States Statutory Invention Registration [19]

[11] Reg. Number: H1,927

Chen et al.

[45] Published: Dec. 5, 2000

[54] EMBOSSED MONOLITHIC POLYMER FILM AND PROCESS OF FORMING THE SAME

[75] Inventors: Zhongshan Chen, Plainville, Mass.; James P. DiPoto, Terre Haute, Ind.

[73] Assignee: Tredegar Corporation, Richmond, Va.

[21] Appl. No.: 09/034,105

[22] Filed: Mar. 3, 1998

[51] Int. Cl.[7] ..... B32B 3/00; B32B 7/02

[52] U.S. Cl. ..... 428/156; 428/213

[58] Field of Search ..... 428/156, 172, 428/182, 213

[56] References Cited

U.S. PATENT DOCUMENTS

| | | | |
|---|---|---|---|
| 3,950,480 | 4/1976 | Adams et al. | 264/284 |
| 3,957,414 | 5/1976 | Bussey, Jr. et al. | 425/384 |
| 3,966,383 | 6/1976 | Bussey, Jr. et al. | 425/388 |
| 3,999,928 | 12/1976 | Asakura et al. | 425/388 |
| 4,155,693 | 5/1979 | Raley | 425/363 |
| 4,157,237 | 6/1979 | Raley | 425/363 |
| 4,252,516 | 2/1981 | Raley et al. | 425/290 |
| 4,284,396 | 8/1981 | Thissen et al. | 425/342 |
| 4,317,792 | 3/1982 | Raley et al. | 264/504 |
| 4,364,723 | 12/1982 | Louis et al. | 425/384 |
| 4,576,669 | 3/1986 | Caputo | 156/145 |
| 4,613,544 | 9/1986 | Burleigh | 428/315.5 |
| 4,644,623 | 2/1987 | Raley et al. | 29/148.4 |
| 4,686,137 | 8/1987 | Ward, Jr. et al. | 428/290 |
| 4,692,369 | 9/1987 | Nomi | 428/198 |
| 4,772,444 | 9/1988 | Curro et al. | 264/557 |
| 4,778,644 | 10/1988 | Curro et al. | 264/557 |
| 4,846,821 | 7/1989 | Lyons et al. | 604/369 |
| 4,878,825 | 11/1989 | Mullane, Jr. | 425/290 |
| 4,999,152 | 3/1991 | Baldwin et al. | 264/555 |
| 5,120,813 | 6/1992 | Ward, Jr. | 528/28 |
| 5,190,812 | 3/1993 | Joseph et al. | 428/297 |
| 5,314,325 | 5/1994 | Bosler | 425/384 |
| 5,593,632 | 1/1997 | Kagawa | 264/284 |
| 5,614,310 | 3/1997 | Delgado et al. | 428/316.6 |
| 5,648,107 | 7/1997 | Kagawa et al. | 425/363 |
| 5,660,882 | 8/1997 | McBride et al. | 427/294 |
| 5,718,928 | 2/1998 | Rieker | 425/290 |

FOREIGN PATENT DOCUMENTS

| | | |
|---|---|---|
| 0305123 | 3/1989 | European Pat. Off. . |
| WO 96/13979 | 5/1996 | WIPO . |

*Primary Examiner*—Charles T. Jordan
*Assistant Examiner*—Aileen J. Baker
*Attorney, Agent, or Firm*—Jenkens & Gilchrist, P.C.

[57] ABSTRACT

A thermoplastic film formed of a monolithic polymer and which is embossed. The film has an embossed height of h, a material thickness of t1 at the apex of the embossed height h, and a material thickness of t2 at the base of the film. The film also has a concave cavity below the apex of the embossed height h. The monolithic polymer film is formed using a screen with a perforated pattern. A monolithic polymer is extruded onto the screen in semi-molten film. The screen is rotated such that the film passes over a vacuum slot behind the screen. A vacuum in the vacuum slot pulls the monolithic polymer into the perforated pattern of the screen without perforating the film. The perforated pattern of the screen is transferred to the monolithic polymer film as the film passes over the vacuum slot.

14 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

EMBOSSED MONOLITHIC POLYMER FILM AND PROCESS OF FORMING THE SAME

BACKGROUND

The present invention relates to films of monolithic polymers, and, in particular, to embossed sheets of a monolithic polymer and methods of forming the same.

Films of monolithic polymers are films which transmit moisture vapor molecules, yet do not transmit liquids. Monolithic polymer films are distinct from "microporous films" in that no micropore exists in the monolithic polymer film. The monolithic polymer films have a chemical affinity to moisture vapor molecules. Moisture vapor molecules on one side of a monolithic polymer film are absorbed by the monolithic polymer. A gradient of moisture vapor content will exist in the monolithic polymer film with a high moisture content on the side of the monolithic polymer film adjacent to the water vapor, and a low moisture content on the opposite side of the monolithic polymer film. The attraction of the monolithic polymers to moisture vapor molecules will cause the low moisture content side of the film to attract moisture vapor molecules from the high moisture content side of the film. Moisture vapor molecules on the low moisture content side of the film will be transmitted to the atmosphere adjacent to the low moisture content side of the film. Moisture Vapor Transmission Rate (MVTR) is the rate that a film will transmit moisture vapor from one surface to another, and is usually expressed in terms of grams per square meter per day ($g/m^2/day$).

Monolithic polymer films are useful in many applications, such as medical applications where ASTM E-22 viral barrier requirements must be met. For example, in a medical application for a garment, the liquid impervious nature of the film is important to protect the wearer from body fluids of a patient which may bear pathogens. However, moisture vapor transmission is important to permit moisture vapor to escape from within the garment and keep the wearer of the garment comfortable. Therefore, it is desirable to have monolithic polymer films with a high MVTR.

Monolithic polymers are a block copolymer containing a hard or crystalline segment and a soft or amorphous segment. The crystalline segment is usually a component such as polybutylene terephthalate, or the like. The amorphous segment is usually a component similar to a component based upon long-chain polyester glycols, or the like. The MVTR properties of a monolithic polymer film are based upon the ratio of the crystalline segment to the amorphous segment. Generally, the greater the amount of amorphous segment per crystalline segment, the greater an MVTR that can be expected for the film.

The amorphous segment of a monolithic polymer film gives the film soft and tacky characteristics. The soft and tacky nature of a monolithic polymer film tends to cause the film to block when wound on a roll. As the proportion of the amorphous segment to the crystalline segment increases in a film, in order to increase the film MVTR, the film will have a greater susceptibility to blocking. To overcome blocking, conventional prior art has utilized a release liner between the layers of monolithic polymer films wound on a roll. The use of a release liner adds costs and handling difficulties in a manufacturing process. Therefore, there is a need for monolithic films with a lower tendency to block without reducing the proportion of the amorphous segment in the film.

Generally, the thinner a monolithic polymer film, the better the film will transmit moisture vapor molecules. However, as a film gets thinner, the film becomes more difficult for handling by manufacturing equipment and end users. Therefore, there is a need for monolithic polymer films that are thin but can easily be handled during manufacturing and by end users.

SUMMARY

The present invention is directed to an apparatus and a method that satisfies the above-referenced needs. In one embodiment, the apparatus is a thermoplastic film comprising a monolithic polymer sheet being embossed with apex sections disposed within base sections, the film having a first side and a second side, the film also having an embossed height between the first side of the film at the base section and the raised side of the film at the base sections.

In a further embodiment, the thermoplastic film further includes a concave cavity disposed on the first side of the film below each of the apex sections.

In another further embodiment, the plastic film includes the base sections having a base thickness between the first side and the raised side of the film, and the apex sections of the film having an apex thickness between the first side and the raised side of the film, and the base thickness of the film is greater than the apex thickness of the film.

In another embodiment, the present invention is a method of forming an embossed monolithic polymer film comprising the steps of providing a screen with a pattern of perforation areas disposed within non-perforated areas; extruding a monolithic polymer film with a first side and a second side; positioning the second side of the monolithic polymer film on the screen; applying a pressure differential across the monolithic polymer film on the screen such that the monolithic polymer film is forced into the perforation areas of the screen without perforating the monolithic polymer film; and removing the monolithic polymer film from the screen. The step of applying the pressure differential includes applying the pressure differential such that apex sections are formed in the monolithic polymer film adjacent to the perforation areas of the screen, and base sections are formed in the monolithic polymer film adjacent to the non-perforated areas of the screen.

In a further embodiment, the step of applying the pressure differential includes forming concave cavities in the apex sections of the monolithic polymer film on the first of the polymer film.

In another further embodiment, the step of applying the pressure differential includes forming the apex sections with an apex thickness between the first side and the second side of the monolithic polymer film being less than a base thickness between the first side and the second side of the monolithic polymer film at the base sections.

BRIEF DESCRIPTION OF THE DRAWINGS

These and other features will become better understood with regard to the following description, appended claims, and accompanied drawings in which:

DETAILED DESCRIPTION

Figure 1:
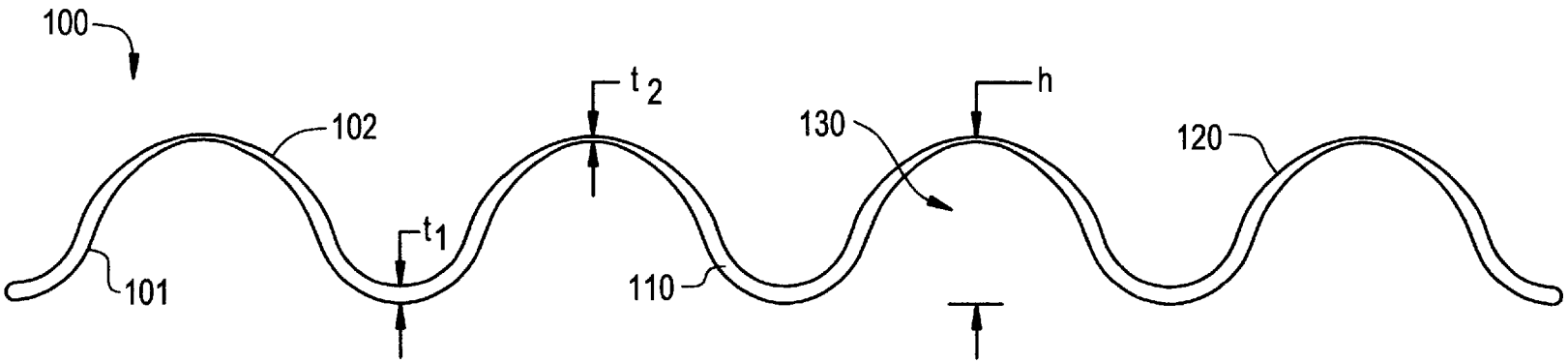
FIG. 1 is a fragmentary enlarged cross-sectional view of one embodiment of the film of the present invention.

Referring now to the figures, and in particular to FIG. 1, there is shown a film 100 of the present invention. The film 100 is a monolithic polymer film having an embossed surface. The film 100 has a first or female surface 101 and a second or male surface 102 that is raised. The embossed film 100 has base or lower sections 110 connected to apex or upper sections 120. The film 100 is embossed such that a concave cavity 130 is created on the female side 101 of each of the upper sections 120. The concave cavity 130 provides an area for the accumulation of the moisture vapor that is absorbed by the monolithic polymer of the film 100.

Still referring to FIG. 1, the lower sections 110 of the film 100 have a base material thickness $t_1$ between the female surface 101 and the male surface 102. The upper sections 120 of the film 100 have an apex thickness $t_2$ between the female surface 101 and the male surface 102. In a preferred embodiment, the thickness $t_1$ of the lower section 110 is greater than the thickness $t_2$ of the upper section 120. Preferred embodiments of the present invention include films with the upper sections 120 having the apex thickness $t_2$ being less than about ten percent (10%) of the base material thickness 110, films with the upper sections 120 having the apex thickness $t_2$ being less than about sixty percent (60%) of the base material thickness 110, and films with the upper sections 120 having the apex thickness $t_2$ being from about ten percent (10%) of the base material thickness $t_1$ to about sixty percent (60%) of the of the base material thickness $t_1$.

Referring still to FIG. 1, the embossed monolithic film 100 has a height h from the female surface 101 at the lower section 110 of the film 100 to the male surface 102 at the upper section 120. In one embodiment, the embossed height h of the monolithic film 100 is from about 7 milinches to about 18 milinches. In one preferred embodiment, the embossed height h of the monolithic polymer film 100 is at least about 14 milinches. The embossed height h of the film 100 provides a cross-sectional bulk to the film 100 to facilitate handling of the film in manufacturing processes and by the end user. In contrast, a monolithic polymer film with no embossing will have only the thickness of the material itself as the cross-sectional bulk. The greater cross-sectional bulk of the monolithic polymer film 100 facilitates the handling during manufacturing processes and by the end user.

Figure 2:
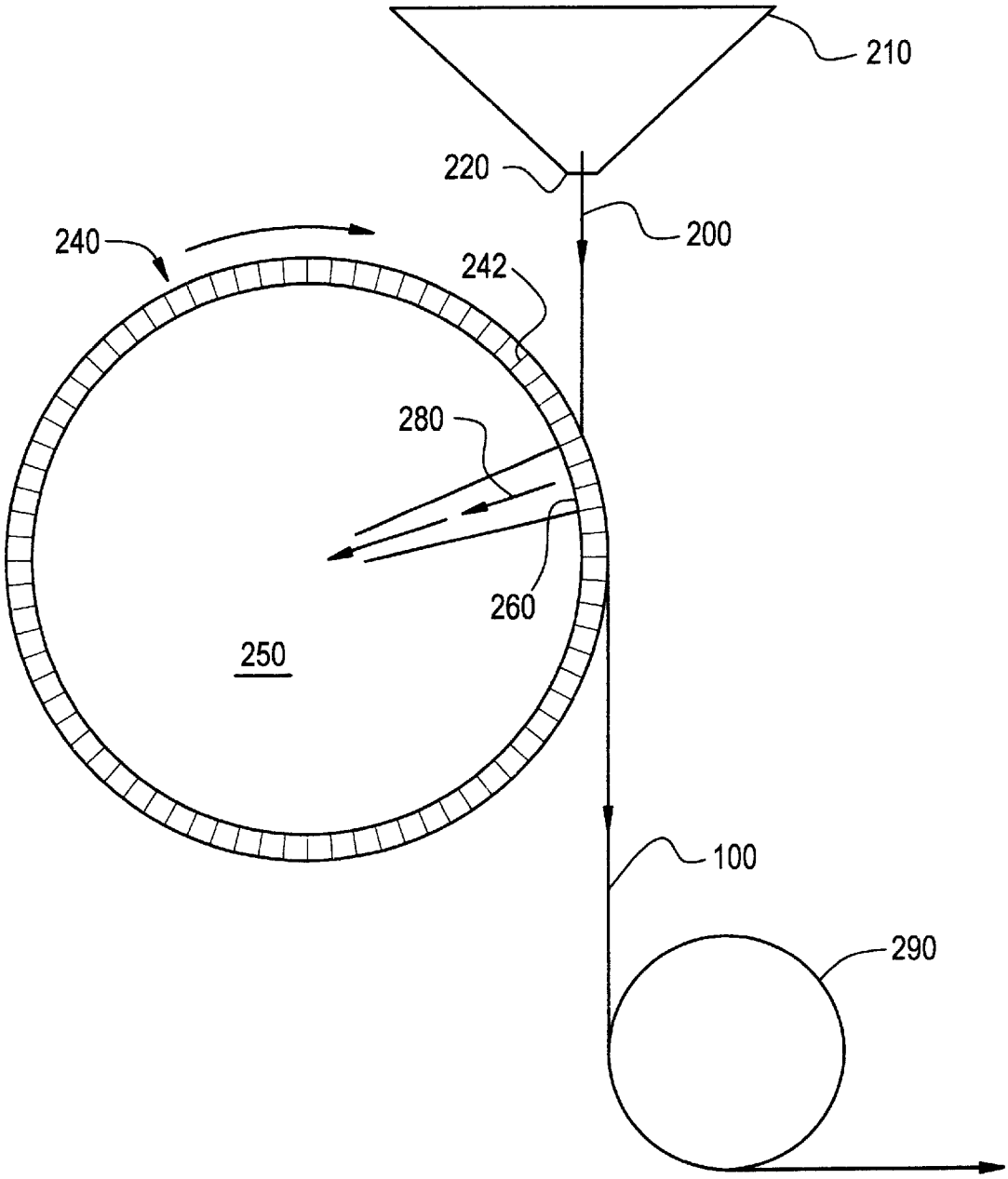
FIG. 2 is a schematic illustrating one method of making the film of the present invention.

Referring now to FIG. 2, there is shown a schematic illustrating one method of forming the monolithic polymer film 100 from FIG. 1. An extruder 210 extrudes through a die 220 a film 200 of a monolithic polymer. The film 200 exiting the extruder 210 contacts a rotating screen 240. The rotating screen 240 has a pattern of openings 242. In one embodiment, the surface of the screen 240 is roughened by sandblasting to reduce the gloss of the film. The screen open patterns can include, but are not limited to, triangle, square, circular, pentagon, hexagon, or a combination thereof. The rotating screen 240 is supported by a stationary tube 250 that has a vacuum slot 260.

Referring still to FIG. 2, as the film 200 on the screen 240 passes over the vacuum slot 260, a vacuum 280 in the vacuum slot 260 applies a pressure differential that draws the film 200 into the open patterns 242 of the screen 240. The vacuum 280 in the vacuum slot 260 is adjusted to draw the film 200 into the form of the embossed film 100. To form the embossed film 100, the vacuum 280 in the vacuum slot 260 is adjusted such that the film 200 is drawn into the openings 242 of the screen 240 the height h without perforating the film 200. It is important that the vacuum 280 in the vacuum slot 260 not be strong enough to perforate the film 200, thereby losing the fluid impervious nature of the film 100. A roll 290 can be used to strip the film 100 from the screen 240.

Monolithic polymers that are suitable for use in the present invention include Hytrel® by Dupont, Pebax® by AutoChem, and Estane® by B.F. Goodrich. If the film 100 is difficult to remove from the screen 240, a material such as talc can be added to the polymer in the extruder 210 for facilitating striping the film 100 from the screen 240.

Conventional embossing of polymer films is performed by pressing the film between a steel pattern roll and a rubber roll. The rubber roll of the prior art presses the film into the pattern on the steel pattern roll, which is transferred onto the film. The aggressive nature of a monolithic polymer for adhering to the rubber roll prevents the effective use of the prior art embossing methods with monolithic polymers. In the present invention, however, it is the vacuum that draws the semi-molten film into the pattern of the metal screen, thus transferring the pattern of the metal screen onto the film. Therefore, the present invention reduces the difficulties that a rubber roll would create if a monolithic polymer were embossed using the prior art method of embossing. Additionally, the prior art process does not create the concave cavity with a significant difference between the film section thicknesses $t_1$ and the thickness $t_2$, as does the present invention. The present invention will provide a embossed film with the apex thickness $t_2$ from less than about sixty percent (60%) of the base material thickness $t_1$ to less than about ten percent (10%) of the base material thickness $t_1$, as compared to only eighty percent (80%) as demonstrated by the prior art method of embossing. Furthermore, the present invention has been demonstrated to create an embossed height h of about 10 milinches or more, which has not been demonstrated by the prior art methods.

The tackiness of a monolithic polymer film also causes the monolithic polymer film to block when the film is in a roll of material. To overcome the tendency to block, the prior art requires that the monolithic polymer film have a carrier sheet, such as a silicone release paper. Part of the present invention is the discovery that a monolithic polymer film embossed according to the present invention inhibits blocking of the monolithic polymer film in a roll without the use of a carrier sheet. Therefore, the present invention reduces or eliminates the need for the use of and expensive carrier sheet with a monolithic polymer film in a roll of material.

EXAMPLES

Examples of the present invention were formed according to the present invention from the monolithic polymer Hytrel® G4778. Hytrel® is a trade name for monolithic polymers sold by DUPONT, in Wilmington, Delaware. These films were formed with a specific thickness by weight (TBW) and with a specific height h. TBW is the average thickness of a film calculated from the weight of the film for a specific area. Because TBW is an average weight, it will differ from the $t_1$ and $t_2$ thickness of the film.

The examples were formed on a screen with a 22 mesh hex pattern with a twenty-four percent (24%) open area. The surface of the screen was also roughened by sandblasting with 480 grit silica.

After the films were formed, they were subjected to tests to determine the MVTR for each film with the following results:

| | | | | | | |
|---|---|---|---|---|---|---|
| TBW (milinches) | 1.0 | 1.0 | 1.5 | 1.5 | 2.0 | 2.0 |
| Embossed Height h (milinches) | 8.4 | 14.6 | 9.1 | 14.9 | 7.2 | 14.3 |
| MVTR ($g/m^2/day$) | 1818 | 2424 | 1515 | 2046 | 1202 | 1510 |

The MVTR values were determined using the test methods according to ASTM E-96. As demonstrated by the above examples, an increase in the embossed height h for a particular TBW provides an increased MVTR.

Although the present invention has been described in considerable detail with reference to certain preferred embodiments thereof, other embodiments and versions are possible. Therefore, the spirit and scope of the intended claims should not be limited to the descriptions of the preferred embodiments contained herein.

What is claimed is:

1. A thermoplastic film comprising a monolithic polymer sheet being embossed with apex sections disposed within base sections, said film having first side and a raised side, and said film having an embossed height between the first side of the film at the base sections and the raised side of the film at the base sections.

2. The thermoplastic film according to claim 1, wherein said embossed height is at least about 10 milinches.

3. The thermoplastic film according to claim 1, wherein said embossed height is at least about 14 milinches.

4. The thermoplastic film according to claim 1, wherein said embossed height is from about 7 milinches to about 18 milinches.

5. The thermoplastic film according to claim 4, wherein said film further includes a concave cavity disposed on the first side of said film below each of said apex sections.

6. The thermoplastic film according to claim 5, wherein the base sections have a base thickness $t_1$ between the first side and the raised side of the film, and wherein the apex sections of said film have an apex thickness $t_2$ between the first side and the raised side of the film, and wherein the base thickness $t_1$ of the base sections is greater than the apex thickness $t_2$ of the apex sections.

7. The thermoplastic film according to claim 6, wherein said apex thickness $t_2$ is from about ten percent (10%) of the base thickness $t_1$ to about sixty percent (60%) of the base thickness $t_1$.

8. The thermoplastic film according to claim 6, wherein said apex thickness $t_2$ is less than about ten percent (10%) of the base thickness $t_1$.

9. The thermoplastic film according to claim 6, wherein said apex thickness $t_2$ is less than about sixty percent (60%) of the base thickness $t_1$.

10. The thermoplastic film according to claim 1, wherein said film further includes a concave cavity disposed on the first side of said film below each of said apex sections.

11. The thermoplastic film according to claim 10, wherein the base sections have a base thickness $t_1$ between the first side and the raised side of the film, and wherein the apex sections of said film have an apex thickness $t_2$ between the first side and the raised side of the film, and wherein the base thickness $t_1$ of the base sections is greater than the apex thickness $t_2$ of the apex sections.

12. The thermoplastic film according to claim 11, wherein said apex thickness $t_2$ is from about ten percent (10%) of the base thickness $t_1$ to about sixty percent (60%) of the base thickness $t_1$.

13. The thermoplastic film according to claim 11, wherein said apex thickness $t_2$ is less than about ten percent (10%) of the base thickness $t_1$.

14. The thermoplastic film according to claim 11, wherein said apex thickness $t_2$ is less than about sixty percent (60%) of the base thickness $t_1$.

* * * * *